United States Patent Office 3,366,604
Patented Jan. 30, 1968

3,366,604
PHOTOSENSITIVE THERMOPLASTIC COPOLYMERS
Siegfried Aftergut, Schenectady, N.Y., assignor to General Electric Company, a corporation of New York
No Drawing. Filed Mar. 26, 1965, Ser. No. 443,173
7 Claims. (Cl. 260—51)

ABSTRACT OF THE DISCLOSURE

Relates to photosensitive copolymers prepared by reacting benzene and multi-cyclic hydrocarbons and their acetamido and aklyamino derivatives or phenols with p-phenylazophenol and an aldehyde in the presence of a catalyst.

---

This invention relates to organic photoconductive materials useful in applications requiring photoconductors such as photoplastic recording. More particularly, this invention relates to photoconductive materials comprising copolymers resulting from the reaction of an aromatic hydrocarbon and p-phenylazophenol with an aldehyde in the presence of a catalyst.

The recording of information on a deformable photoconductive medium in the form of minute light-modifying deformations is known. By one such method of information storage, the deformations are formed on the storage medium by first charging the surface to a uniform potential, then exposing to electromagnetic radiation and finally making the effect of the radiation visible by heat-softening the deformable storage medium. Exposure to electromagnetic radiation produces a latent electrostatic image. On softening the storage medium, the electrostatic forces cause the formation of physical deformations which correspond to the charge pattern of the latent image. Upon cooling the medium, the deformations become permanently fixed on the surface of the recording medium and are thereby permanently stored unless erased by heating. The information stored in the form of these deformations is retrieved by projecting a beam of light through the medium. The projecting light is diffracted or refracted by the deformations to produce a spatial light image corresponding to the original image.

The information storage medium as known may comprise a multilayer laminate, one of the layers comprising a photoconductive material. The laminate may be prepared in the form of any suitable configuration such as, for example, a tape, disc, or sheet. The recording layer of the laminate may be prepared from a solid thermoplastic polymer or a mixture of such polymers which are deformable by the application of heat.

Organic photoconductors usually do not have desirable mechanical and film-forming properties; hence, it is the general practice to dissolve or disperse these photoconductors in an inert polymeric media such as polystyrene and polyvinyl chloride. The mixtures of inert media and photoconductors have considerable drawbacks in practical applications including lack of homogeneity, because of the incompatibility of the components, and difficulty of preparing thin films due to the solubility differences of the components. Further, there may be a decrease of photoconductor concentration during storage or use due to photoconductor volatility. These disadvantages are eliminated by the use of photoconductor compositions made in accordance with my invention. Such photoconductors are characterized by their homogeneity, stability, and film-forming ability.

It is therefore, one object of my invention to provide a stable photoconductive material.

It is a further object of my invention to provide a homogeneous photoconductive material.

It is a further object of my invention to provide a photoconductive material that has excellent film-forming properties.

Briefly, this invention relates to the synthesis of copolymers of an aromatic hydrocarbon and p-phenylazophenol with an aldehyde. Preferably, the invention relates to the synthesis of copolymers of naphthalene and p-phenylazophenol having photosensitive properties by reacting naphthylene and p-phenylazophenol with paraformaldehyde in the presence of a catalyst.

Those parts of my invention which are considered to be new are set forth in detail in the claims appended hereto. The invention, however, may be better understood and further objects and advantages thereof appreciated from a consideration of the following description.

The reactions of formaldehyde with phenol and hydrocarbons to give polymeric products is well known. See, for example, "Formaldehyde" by J. F. Walker, Reinhold Publishing Corp., New York, 1953. The reactions may be carried out in a number of reaction media and are catalyzed by a wide variety of acids and bases. Suitable reaction media include water, acetic acid, and nitrobenzene. The catalysts which may be used include sulfuric acid, zinc chloride, aluminum chloride and sodium hydroxide. Depending on the molar ratio of formaldehyde and phenol or hydrocarbon used, the products may be thermoplastic or thermo-set. Sources of formaldehyde are formalin, symmetrical dichloromethyl ether, gaseous formaldehyde, paraformaldehyde, and other formaldehyde polymers. All of these reaction media, catalyst and aldehydes are suitable for the present invention.

In a preferred embodiment of the invention copolymers were prepared by allowing a reaction to take place between naphthalene, p-phenylazophenol and paraformaldehyde in an acetic acid solution and in the presence of zinc chloride as a catalyst. The relative amounts of naphthalene and p-phenylazophenol were varied using a maximum ratio of 20 moles of naphthalene per mole of the phenol to a minimum ratio of 5 moles of naphthalene per mole of phenol. The exact chemical structure of the products is not known. It is likely, however, that the naphthalene and p-phenylazophenol are linked by methylene bridges provided by the paraformaldehyde. The products were orange in color and had a melting point range from about 100° to 170° C.

I may use other compounds as represented by the general formula R-Y where R is benzene, naphthalene, anthracene and other multi-cyclic ring-hydrocarbons and Y is hydrogen, hydroxy, alkyloxy, phenoxy, acetamido, alkylamino and dialkylamino. Examples of R-Y are anisole, phenetole, phenol, acetanilide, diphenyl ether, naphthol, methyl naphthyl ether, hydroxy-anthracene, and methoxyanthracene.

Of all the reaction media and catalyst recited above as being suitable in preparing the photosensitive material described, I prefer to use acetic acid as the reaction medium and zinc chloride as the catalyst. The reactions may be carried out at temperatures ranging from room temperature to about 170° C. The ratio of hydrocarbon or derivative to p-phenylazophenol may vary over a wide range, from about 40:1 to about 0.5:1 depending upon the desired degree of photosensitivity and the desired mechanical and physical properties such as the melting point and melt viscosity. The preferred ratio is between 20:1 and 5:1.

The following specific examples are given to illustrate the various advantages of the present invention and are not to be taken as limiting in any way. All parts are by weight.

EXAMPLE 1

In a suitable vessel maintained under a blanket of nitrogen were combined 57.6 g. of naphthalene, 10 g. of p-phenylazophenol, 15 g. paraformaldehyde, 25 g. of zinc chloride and 300 ml. of acetic acid. The molar ratio of naphthalene to phenol was 9:1. The mixture was heated at reflux for 3 hours, cooled to room temperature and poured on a mixture of ice and water. The aqueous solution was extracted with 300 ml. of benzene and the extract was washed with water, aqueous sodium hydroxide and water, and finally dried. The dried benzene extract was freeze-dried to yield 25 g. of an orange powder whose melting range was 105–110° C. The molecular weight of this powder was about 667. An elemental analysis showed that it contained 89.3% hydrogen, and 2.65% nitrogen.

EXAMPLE 2

This example relates to the preparation of a copolymer using a ratio of 20 moles of naphthalene per mole of p-phenylazophenol. A mixture consisting of 32 g. of naphthalene, 2.5 g. of p-phenylazophenol, 7.9 g. of paraformaldehyde, 12.5 g. of zinc chloride and 150 ml. of acetic acid was allowed to reflux for 6 hours. The solution was poured on ice water to give a precipitate which was extracted into benzene. The benzene solution was slowly added with agitation to a large volume of methanol to give an orange powder. This powder was again dissolved in benzene and re-precipitated into methanol. There was obtained about 20 g. of an orange product whose melting range was 138–170° C. The polymer had a molecular weight of 800. An elemental analysis indicates the presence of 90.8% carbon, 5.99% hydrogen and 1.74% nitrogen.

EXAMPLE 3

This example relates to the preparation of a copolymer using a ratio of 5 moles of naphthalene per mole of p-phenylazophenol. A mixture of 32 g. of naphthalene, 10 g. of p-phenylazophenol, 9 g. of paraformaldehyde, 12.5 g. of zinc chloride and 150 ml. of acetic acid was heated at reflux for 6 hours. On cooling a precipitate was obtained. This precipitate would not melt below 250° C. and was discarded. The acetic acid filtrate from this precipitate was poured on ice water to yield a second precipitate which was extracted into benzene. The benzene solution was added to methanol to give an orange powder. The orange powder was purified again by solution in benzene and re-precipitation into methanol. The melting point range of this product was 138–170° C. The polymer had a molecular weight of 900. In an elemental analysis it was found that the lower melting product contained 87.0% carbon, 5.47% hydrogen, and 4.07% nitrogen.

The photosensitive properties of the above described copolymers were determined as illustrated in the following examples:

EXAMPLE 4

The copolymers obtained in Examples 1–3 were dissolved in benzene and films were cast on glass plates provided with a thin electrically conductive layer of tin-oxide. The films were given a negative electrostatic charge with the aid of a corona discharge device. The charged films were exposed to an optical image from a mercury vapor light source. On heating the films to their softening temperature, images in the form of tiny ripples were formed on the surface.

EXAMPLE 5

Films prepared by the method described in Example 4 were exposed to an optical image without prior electrostatic charging. Heating the films to their flow points produced images on the surface in the form of tiny ripples. This experiment proves that the copolymers of this invention are useful in the recording of images without need for electrostatic charging before or after exposure.

The polymers prepared in Examples 1 through 3 are thermoplastic because of the molar ratio of naphthalene, p-phenylazophenol and formaldehyde. By increasing the relative amount of aldehyde used in the reaction it is possible to synthesize photosensitive thermosetting products which cannot be used in photoplastic recordings but can be used in xerography or other applications where photoconductors are needed.

As many widely different embodiments of this invention may be made without departing from the spirit and scope thereof, it is to be understood that this invention is not limited to the specific embodiments thereof except as defined in the appended claims.

What I claim as new and desire to secure by Letters Patent of the United States is:

1. A photoconductive material comprising the reaction product of (1) a compound having the formula

R-Y where R is selected from a group consisting of benzene and multicyclic ring-hydrocarbons and Y is selected from the group consisting of hydrogen, hydroxy, alkyloxy, phenoxy, acetamido, alkylamino and dialkylamino, (2) p-phenylazophenol and (3) an aldehyde.

2. The product of claim 1 wherein R-Y is benzene.
3. The product of claim 1 wherein R-Y is anthracene.
4. The product of claim 1 wherein R-Y is phenol.
5. The product of claim 1 wherein R-Y is naphthol.
6. A photoconductive material comprising the reaction product of naphthalene with p-phenylazophenol and paraformaldehyde.
7. A process of making thermoplastic photoconductive material which comprises reacting (1) a compound having the formula

R-Y where R is selected from a group consisting of benzene and multicyclic ring-hydrocarbons and Y is selected from the group consisting of hydrogen, hydroxy, alkyloxy, phenoxy, acetamido, alkylamino and dialkylamino, (2) p-phenylazophenol and (3) an aldehyde in the presence of a catalyst.

References Cited

UNITED STATES PATENTS 3,206,306   9/1965   Neugebauer _____ 96—1
3,240,597   3/1966   Fox _____ 96—1

WILLIAM H. SHORT, *Primary Examiner.*

H. E. SCHAIN, *Assistant Examiner.*